(12) United States Patent
Furutani et al.

(10) Patent No.: US 9,698,426 B2
(45) Date of Patent: Jul. 4, 2017

(54) ALUMINUM ALLOY FOIL FOR ELECTRODE CURRENT COLLECTOR, METHOD FOR MANUFACTURING SAME, AND LITHIUM ION SECONDARY BATTERY

(71) Applicants: UACJ Corporation, Chiyoda-ku, Tokyo (JP); UACJ Foil Corporation, Chuo-ku, Tokyo (JP)

(72) Inventors: Tomohiko Furutani, Kusatsu (JP); Kenji Yamamoto, Kusatsu (JP); Satoshi Suzuki, Chiyoda-ku (JP); Masakazu Seki, Chiyoda-ku (JP)

(73) Assignees: UACJ CORPORATION, Tokyo (JP); UACJ FOIL CORPORATION, Tokyo (JP)

( * ) Notice: Subject to any disclaimer, the term of this patent is extended or adjusted under 35 U.S.C. 154(b) by 0 days.

(21) Appl. No.: 14/395,455

(22) PCT Filed: Apr. 19, 2013

(86) PCT No.: PCT/JP2013/061684
§ 371 (c)(1),
(2) Date: Oct. 17, 2014

(87) PCT Pub. No.: WO2013/161726
PCT Pub. Date: Oct. 31, 2013

(65) Prior Publication Data
US 2015/0132657 A1    May 14, 2015

(30) Foreign Application Priority Data

Apr. 24, 2012  (JP) ................................. 2012-099042

(51) Int. Cl.
| | | |
|---|---|---|
| H01M 10/0525 | (2010.01) | |
| H01M 4/66 | (2006.01) | |
| C22F 1/04 | (2006.01) | |
| C22F 1/043 | (2006.01) | |
| C22F 1/057 | (2006.01) | |
| C22C 21/00 | (2006.01) | |
| C22F 1/00 | (2006.01) | |
| H01G 11/68 | (2013.01) | |
| C22C 21/02 | (2006.01) | |
| C22C 21/14 | (2006.01) | |
| H01M 10/052 | (2010.01) | |
| H01M 4/131 | (2010.01) | |

(52) U.S. Cl.
CPC ............. *H01M 4/662* (2013.01); *C22C 21/00* (2013.01); *C22C 21/02* (2013.01); *C22C 21/14* (2013.01); *C22F 1/00* (2013.01); *C22F 1/04* (2013.01); *C22F 1/043* (2013.01); *C22F 1/057* (2013.01); *H01G 11/68* (2013.01); *H01M 4/131* (2013.01); *H01M 10/052* (2013.01); *H01M 10/0525* (2013.01); *Y02E 60/13* (2013.01)

(58) Field of Classification Search
None
See application file for complete search history.

(56) References Cited

U.S. PATENT DOCUMENTS

| | | | |
|---|---|---|---|
| 4,214,041 A | 7/1980 | Fister, Jr. et al. | |
| 5,993,573 A * | 11/1999 | Selepack | ................. C22C 21/00 |
| | | | 148/551 |
| 6,350,532 B1 | 2/2002 | Davisson et al. | |
| 2014/0255788 A1 | 9/2014 | Seki et al. | |

FOREIGN PATENT DOCUMENTS

| | | |
|---|---|---|
| CN | 1148630 A | 4/1997 |
| EP | 0 972 089 A1 | 1/2000 |
| EP | 2 738 847 A1 | 6/2014 |
| JP | 2970852 B2 | 11/1999 |
| JP | 2006-219742 A | 8/2006 |
| JP | 2007-138234 A | 6/2007 |
| JP | 2011-026656 A | 2/2011 |
| JP | 2011-074433 A | 4/2011 |
| JP | 2011-219865 A | 11/2011 |
| JP | 2012-013960 A | 1/2012 |
| JP | 2012-021205 A | 2/2012 |
| WO | 2013/018162 A1 | 7/2013 |

OTHER PUBLICATIONS

JP 2011074433-Translation.*
International Search Report mailed Jul. 2, 2013, issued in corresponding International Application No. PCT/JP2013/061684, filed Apr. 19, 2013, 4 pages.
Office Action mailed Nov. 10, 2015, issued in corresponding Chinese Patent Application No. 2013800211218, filed Apr. 19, 2013, 17 pages.
Extended European Search Report mailed Mar. 17, 2016, issued in corresponding European Application No. 13781737.5, filed Apr. 19, 2013, 12 pages.

* cited by examiner

*Primary Examiner* — Ladan Mohaddes
(74) *Attorney, Agent, or Firm* — Christensen O'Connor Johnson Kindness PLLC

(57) ABSTRACT

The present invention provides an aluminum alloy foil for electrode current collector, high in strength and superior in heat resistance after the active material coating/drying process of the manufacture of the battery, a manufacturing method thereof, and a lithium ion secondary battery. According to the present invention, an aluminum alloy foil for electrode current collector, including 0.1 to 0.5 mass % (hereinafter mass % is referred to as %) of Fe, 0.01 to 0.5% of Si, 0.01 to 0.2% of Cu, 0.01 to 0.5% of Mn, with the rest being Al and unavoidable impurities, wherein tensile strength of an aluminum alloy foil and a heat treatment selected from 24 hours at 100° C., 3 hours at 150° C., and 15 minutes at 200° C., is 210 MPa or higher, a manufacturing method thereof, and a lithium ion secondary battery are provided.

3 Claims, No Drawings

ALUMINUM ALLOY FOIL FOR ELECTRODE CURRENT COLLECTOR, METHOD FOR MANUFACTURING SAME, AND LITHIUM ION SECONDARY BATTERY

TECHNICAL FIELD

The present invention relates to electrode current collectors used for secondary batteries, electrical double-layer capacitors, lithium-ion capacitors, etc., and more particularly to aluminum alloy foils used for electrode current collectors of a positive electrode or a negative electrode of lithium-ion secondary batteries, manufacturing method thereof, and lithium ion secondary batteries.

BACKGROUND

Lithium-ion secondary batteries with high energy density have been used as power sources for portable electronics such as a mobile phone and a lap-top computer.

An electrode material of a lithium-ion secondary battery includes a positive electrode material, a separator, and a negative electrode material. Regarding the positive electrode material, an aluminum alloy foil has been used as a current collector, having excellent electrical conductivity and less heat generation without affecting electrical efficiency of a secondary battery. The positive electrode material comprises a current collector and an active material layer. Specifically, the positive electrode material can be obtained by first forming the active material layer by applying the active material (including material, hereinafter the same shall apply) having a lithium-containing metal oxide such as $LiCoO_2$ as a chief component on one or both surface of an aluminum alloy foil followed by drying, and then performing compression forming to the active material layer using a pressing machine (hereinafter, this step of compression forming is referred to as press working). Lithium ion secondary battery can be obtained in the following manner. The positive electrode material thus prepared, a separator, and a negative electrode material are stacked, and then the resulting stack is wound. After performing a shaping process to put it in a desired shape, it is encased with an electrolyte solution.

An aluminum alloy foil used for a positive electrode material of a lithium-ion secondary battery has problems that ruptures occur at a bending portion during winding. Thus, high strength is required. In the drying step after the coating of the active material, heat treatment is carried out at about 100 to 200° C. Accordingly, strength of aluminum is decreased by such heating, making the aluminum likely to generate center buckle during press working. This induces wrinkles during winding, which reduces adhesion between the active material and the aluminum alloy foil. In addition, a rupture is likely to occur when slitting in the post-process. In particular, the decrease in the adhesion between the active material and the surface of the aluminum alloy foil would facilitate peeling of the active material during battery use, when charge and discharge is repeated. Therefore, there is a problem that the capacity of the battery would decrease.

Patent Literature 1 discloses an aluminum alloy foil for an electrode current collector of a battery, tensile strength of the bare foil being 220 to 270 MPa. Patent Literature 2 discloses an aluminum alloy foil for an electrode current collector of a battery, tensile strength of the bare foil being 220 MPa or higher. However, neither Patent Literature 1 nor Patent Literature 2 discloses of the strength of a foil after heating. In general, after the foil for lithium ion battery electrode is prepared, an active material layer is further formed. Here, in such case, heat treatment is carried out in order to dry the active material layer. That is, even when the tensile strength of foil for lithium ion battery electrode is sufficient immediately after its preparation, the foil is affected by the heat treatment. When the foil is used as an electrode, the tensile strength of the foil being decreased is problematic regarding the strength. Neither one of the aluminum alloy foils disclosed in Patent Literature 1 nor Patent Literature 2 can solve the problem of such decrease in strength.

CITATION LIST

Patent Literature

Patent Literature 1: JP 2011-219865A
Patent Literature 2: JP 2012-21205A

SUMMARY OF THE INVENTION

Technical Problem

The present invention has been made by taking the afore-mentioned circumstances into consideration. An object of the present invention is to provide an aluminum alloy foil for electrode current collector, high in strength and superior in heat resistance after the active material coating/drying process of the manufacture of the battery, a manufacturing method thereof, and a lithium ion secondary battery.

Solution to Problem

The present inventors have made a study on the aluminum alloy foil used for the current collector of the lithium ion secondary battery. Accordingly, the present inventors have found that high strength after the heat treatment during the drying step after the coating of the active material can be maintained, by controlling the solid-solution and precipitation state conditions for their elements, which is achieved by regulating the content of the component within an appropriate range and by optimizing the temperature conditions applied during the homogenization treatment of the ingot and during the hot rolling.

That is, according to the present invention, an aluminum alloy foil for electrode current collector, comprising: 0.1 to 0.5 mass % (hereinafter mass % is referred to as %) of Fe, 0.01 to 0.5% of Si, 0.01 to 0.2% of Cu, 0.01 to 0.5% of Mn, with the rest consisting of Al and unavoidable impurities, wherein a tensile strength of an aluminum alloy foil after a final rolling and a heat treatment selected from the group consisting of 24 hours at 100° C., 3 hours at 150° C., and 15 minutes at 200° C., is 210 MPa or higher, is provided Preferably, the aluminum alloy foil after the final rolling has a tensile strength of 230 MPa or higher and 330 MPa or lower.

Preferably, the aluminum alloy foil comprises 0.2 to 0.48% of Fe, 0.05 to 0.3% of Si, 0.02 to 0.16% of Cu, and 0.05 to 0.3% of Mn.

Preferably, an electrical conductivity of the aluminum alloy foil is 45% IACS or higher.

Preferably, a thickness of the aluminum alloy foil is 6 to 30 μm.

According to another aspect of the present invention, a method for manufacturing an aluminum alloy foil for electrode current collector, comprising the steps of: performing a homogenization treatment of an aluminum ingot comprising 0.1 to 0.5% of Fe, 0.01 to 0.5% of Si, 0.01 to 0.2% of Cu, 0.01 to 0.5% of Mn, with the rest consisting of Al and unavoidable impurities for 1 to 20 hours at 570° C. or higher and 620° C. or lower, is provided.

Preferably, a hot rolling after the homogenization treatment with a starting temperature of 520° C. or higher and an end-point temperature of 330° C. or lower is performed; and a plurality of cold rolling is performed; wherein an intermediate annealing is not performed immediately before the plurality of cold rolling or in between each of the plurality of cold rolling.

Preferably, a time required to go through a temperature range of 350 to 500° C. during the hot rolling is within 20 minutes.

Preferably, the aluminum ingot comprises 0.2 to 0.48% of Fe, 0.05 to 0.3% of Si, 0.02 to 0.16% of Cu, and 0.05 to 0.3% of Mn.

Preferably, the homogenization treatment is performed at 590° C. or higher and 620° C. or lower.

According to another aspect of the present invention, a lithium ion secondary battery comprising the aluminum alloy foil for electrode current collector of any one of claims 1 to 5 as a current collector.

Advantageous Effects of Invention

The aluminum alloy foil for electrode current collector of the present invention is high in strength after the active material coating/drying process. Therefore, such aluminum foil is resistant from generation of center buckle during press working, capable of preventing peeling-off of the active material and raptures during the slitting process, and thus can be used as the electrode current collector for various lithium ion electrodes, lithium ion capacitors and the like. In addition, by the manufacturing method of the present invention, the afore-described superior aluminum alloy foil for electrode current collector can be efficiently obtained.

DESCRIPTION OF EMBODIMENTS

<Composition of Aluminum Alloy Foil>

The aluminum alloy foil for electrode current collector according to the present invention comprises: 0.1 to 0.5% of Fe, 0.01 to 0.5% of Si, 0.01 to 0.2% of Cu, 0.01 to 0.5% of Mn, with the rest consisting of Al and unavoidable impurities.

Si is an element that increases strength by addition thereof, and 0.01 to 0.5% of Si is included. When the additive amount of Si is less than 0.01%, there is no contribution to the improvement in strength. In addition, Si is included in common Al base metal as impurities. As a result, in order to restrict the amount of Si to less than 0.01%, a high-purity base metal need be used. This is difficult to achieve in view of economic reasons. In contrast, when the additive amount of Si exceeds 0.5%, the strength would be excessively high, decreasing rollability. The more preferable additive amount of Si is 0.05 to 0.3%.

Fe is an element that increases strength by addition thereof, and 0.1 to 0.5% of Fe is included. When the additive amount of Fe is less than 0.01%, there is no contribution to the improvement in strength. In contrast, when the additive amount of Fe exceeds 0.5%, the strength would be excessively high, decreasing rollability. The more preferable additive amount of Fe is 0.2 to 0.48%.

Cu is an element that increases strength by addition thereof, and 0.01 to 0.2% of Cu is included. When the additive amount of Cu is less than 0.1%, there is no contribution to the improvement in strength. In contrast, when the additive amount of Cu exceeds 0.2%, work hardening becomes high, and thus the foil becomes prone to cut during the rolling. The more preferable additive amount of Cu is 0.02 to 0.16%.

Mn is an element that increases strength by addition thereof, and 0.01 to 0.5% of Mn is included. When the additive amount of Mn is less than 0.01%, there is no contribution to the improvement in strength. In contrast, when the additive amount of Mn exceeds 0.5%, the strength would be excessively high, decreasing rollability. The more preferable additive amount of Mn is 0.05 to 0.3%.

The material of the present invention contains unavoidable impurities such as Cr, Ni, Zn, Mg, Ti, B, V, and/or Zr. An amount of each of the unavoidable impurities is preferably 0.02% or less, and a total amount thereof is preferably 0.15% or less.

<Tensile Strength after Final Cold Rolling>

Regarding an aluminum alloy added with a minute amount of Fe, Si, Cu, and Mn, when the temperature conditions for the homogenization treatment and the hot rolling are optimized, allowing each of the minutely added elements to form solid solution as much as possible, movement of dislocations can be reduced, thereby maintaining higher strength. Further, as the content of the solid solution increase, work hardening during processing increase. Accordingly, increase in the strength of the aluminum alloy foil during cold rolling and foil rolling becomes large, thereby enabling to improve the strength of the aluminum alloy foil.

It is preferable that the tensile strength after the final cold rolling is 230 MPa or higher and 330 MPa or lower. When the tensile strength is lower than 230 MPa, the strength is insufficient. Consequently, tension imposed during the following process of coating the active material is likely to produce cuts and cracks. In addition, the above causes defects such as center buckle, exerts adverse effects on its productivity, and is thus not preferred. On the other hand, when the tensile strength exceeds 330 MPa, the strength would be excessively high, easily producing cuts during rolling, and thus this is also not preferred.

<Strength after Heat Treatment>

The heat treatment mentioned herein is a heat treatment which is conducted during the preparation step of the electrode material using the current collector of the present invention. Here, it is a drying step performed after applying the active material in order to remove the solvent contained in the active material. Specifically, it is a heat treatment performed by either one of the conditions of 24 hours at 100° C., 3 hours at 150° C., or 15 minutes at 200° C. In this drying step, a heat treatment is performed at the temperature of approximately 100 to 200° C. With the conventional foils, such heat treatment resulted in cases where the aluminum alloy foil softened, thereby changing mechanical characteristics of the aluminum alloy foil. Therefore, the strength of the aluminum alloy foil after the heat treatment becomes important. Especially regarding the heat treatment at 100 to 200° C. performed as the drying step after applying the active material, the aluminum alloy foil receives external heat energy and is activated to go under movement of dislocations easily. This would cause decrease in strength during the course of recovery. In order to prevent strength from decreasing during the course of recovery, it is effective to suppress movement of dislocations by solid-solution elements or precipitates in the alloy. Regarding an aluminum alloy added with a minute amount of Fe, Si, Cu, and Mn of the present invention, solid solution of Fe and Mn have large effects. That is, by controlling the homogenization treatment temperature of an ingot, more of the Fe and Mn that are added by a minute amount can form the solid solution. In addition, precipitation of Fe solid solution and Mn solid solution can be suppressed as much as possible during the hot rolling to maintain high solid solution content. Accordingly, the decrease in strength after the heat treatment can be suppressed by controlling the homogenization treatment conditions and the hot rolling conditions, thereby achieving tensile strength of 210 MPa or higher even after either one of the heat treatment of 24 hours at 100° C., 3 hours at 150° C., or 15 minutes at 200° C. When the tensile strength after the heat treatment described above is lower than 210 MPa, the aluminum alloy foil is likely to have center buckle during the press working, wrinkles during winding, peeling of active material, and rupture during the slitting step. Therefore, such tensile strength is not favorable.

<Electrical Conductivity>

The electrical conductivity of the aluminum alloy foil for electrode current collector of the present invention is not particularly limited, so long as it can be used as the electrode. Here, it is preferable that the electrical conductivity is 45% IACS or higher, especially preferably 50% IACS or higher. The electrical conductivity can be adjusted to a desired value by adjusting the solid solution state of the solute element. The electrode current collector of the present invention can be used as the lithium ion secondary battery. In such case, when the electrical conductivity is too low, it would be unfavorable since the battery capacity decreases when used at a high current value exceeding a discharging rate of 5 C.

<Manufacturing Method of Aluminum Alloy Foil for Electrode Current Collector>

In one example, the aluminum alloy foil for electrode current collector of the present invention can be manufactured by the following method.

First, an ingot is obtained by casting by the semi-continuous casting or the continuous casting. An aluminum alloy having the afore-mentioned composition can be used to obtain the ingot. Then, the aluminum alloy ingot thus obtained is subjected to a homogenization treatment for 1 to 20 hours at 570 to 620° C. In the viewpoint of allowing more of the solute element to form solid solution and to maintain strength, the homogenization treatment is performed preferably at 590° C. or higher and 620° C. or lower.

When the temperature of the homogenization treatment is lower than 570° C. or the holding time of the treatment is less than 1 hour, it is unfavorable since elements such as Fe and Mn would not form solid solutions sufficiently, thereby resulting in insufficient solid solution content and decrease in strength. When the temperature exceeds 620° C., the ingot melts locally. In addition, a tiny amount of hydrogen gas mixed during casting appears on the surface, thereby readily causing swelling on the material surface. The above condition is thus not favorable. In addition, when the homogenization treatment exceeds 20 hours, it is unfavorable in the viewpoint of productivity and cost.

The above homogenization treatment is followed by hot rolling, cold rolling, and foil rolling to obtain the aluminum alloy foil for the current collector. It is preferable to start the hot rolling at the temperature of 520° C. or higher after the homogenization treatment. When the starting temperature of the hot rolling is lower than 520° C., precipitation amount of elements such as Fe and Mn increases, thereby leading to cases where it becomes difficult to maintain the solid solution amount to improve strength. In particular, the solid solution amount of Fe and Mn may have large effects on the maintenance of strength after heating. In the present invention, since the temperature range of 350 to 500° C. for the conventional hot rolling is a temperature range in which Fe-based compounds and Mn-based compounds easily precipitate, it is important to suppress the time going through this temperature range. Here, in the hot rolling, the time required to go through the temperature range of 350 to 500° C. is within 1 hour for example, and preferably within 20 minutes.

The end-point temperature of the hot rolling is preferably 330° C. or lower. The end-point temperature of the hot rolling can be determined by adjusting processing heat and cooling conditions by changing the line speed. The aluminum sheet which went under the hot rolling is wound as a coil at the outlet of the hot roller. By decreasing the end-point temperature of the hot rolling, time required to cool the coil can be shortened, thereby suppressing the precipitation of Fe and Mn. When the end-point temperature of the hot rolling exceeds 330° C., Fe-based compounds and Mn-based compounds would easily precipitate during the cooling, resulting in decrease in the solid solution amount of Fe and Mn. This would decrease the strength of the aluminum alloy foil after the final cold rolling.

The cold rolling and foil rolling (final cold rolling) performed after the hot rolling is performed without any intermediate annealing before, after, or in between each of the rolling. If the intermediate annealing is performed, the strain accumulated during the hot rolling and the cold rolling before the intermediate annealing is released, and Fe and Mn which have formed solid solutions during the homogenization treatment and the hot rolling would precipitate, leading to decrease in the solid solution amount of Fe and Mn. Therefore, there may be cases where the strength of the aluminum alloy foil after the final cold rolling decreases.

The thickness of the aluminum alloy foil of the present invention can be adjusted as necessary. When it is used as the aluminum alloy foil for electrode current collector, it can be adjusted to 6 to 30 μm. Here, the aluminum alloy foil may be subjected to double rolling as necessary. When the thickness is less than 6 μm, it is unfavorable since it becomes prone to generate pin holes during foil rolling. In addition, cuts occur during foil rolling and during the active material coating process. When the thickness exceeds 30 μm, it is unfavorable since the volume and weight of the electrode current collector itself would increase and the volume and weight of the active material would decrease in the same occupied space. This would lead to decrease in battery capacity when it is used especially as the current collector of a lithium ion secondary battery.

When the current collector of the present invention is used as the electrode structure, a carbon coating may be further provided on the surface of the current collector of the present invention in order to decrease the electrical resistance and to improve adhesion with the active material.

Examples

The present invention will be explained in detail with reference to Examples, however, the following Examples are merely provided for exemplification, and thus the present invention shall not be limited to these Examples.

Aluminum alloys having the compositions as designated in Table 1 were subjected to casting using semi-continuous casting to prepare ingots with a thickness of 500 mm. Next, the ingots were subjected to scalper, followed by homogenization treatment under conditions designated in Table 2. After the homogenization treatment, hot rolling was performed to obtain an aluminum sheet having a thickness of 3.0 mm. Then, without performing intermediate annealing, plurality of cold rolling processes were repeated, thereby obtaining the aluminum alloy foil.

Regarding the Comparative Examples, they were prepared in the same manner as the afore-mentioned Examples. Here, regarding Comparative Examples Nos. 27 to 31, cold rolling was conducted after the hot rolling to obtain the sheet thickness of 1.6 mm, followed by intermediate annealing at the temperatures shown in Table 2. Then, cold rolling was further performed to give the aluminum alloy foil having the foil thickness as shown in Table 2. Here, "CAL" in Table 2 means an intermediate annealing by continuous annealing.

Each of the aluminum alloy foils thus obtained was evaluated for its tensile strength, electrical conductivity, tensile strength after heat treatment for 24 hours at 100° C., tensile strength after heat treatment for 3 hours at 150° C., and tensile strength after heat treatment for 15 minutes at 200° C. The results are shown in Table 3. In addition, evaluation was made on whether cuts occurred during foil rolling (final cold rolling). The results are shown in Table 3.

Next, each of the aluminum alloy foils was used to prepare a positive electrode material of a lithium ion secondary battery. PVDF as a binder was added to an active material primarily containing $LiCoO_2$ to yield a positive material slurry. The active material slurry was applied on both surfaces of the aluminum alloy foil having a width of mm. Then, the resulting aluminum alloy foil was subjected to heat treatment for drying under either one of three different conditions including 24 hours at 100° C., 3 hours at 150° C., and 15 minutes at 200° C. After that, a roller press machine was used to perform press working to increase the density of the active material to give the positive electrode material. Evaluation was made on whether cuts occurred at the active material coating process and on whether wrinkles occurred during the active material press working process.

TABLE 1

| | | Chemical Component (mass %) | | | | |
|---|---|---|---|---|---|---|
| | Alloy | Si | Fe | Cu | Mn | Al and unavoidable impurities |
| Example | A | 0.08 | 0.41 | 0.03 | 0.15 | rest |
| | B | 0.01 | 0.41 | 0.06 | 0.15 | rest |
| | C | 0.50 | 0.21 | 0.07 | 0.05 | rest |
| | D | 0.30 | 0.10 | 0.08 | 0.15 | rest |
| | E | 0.15 | 0.50 | 0.02 | 0.10 | rest |
| | F | 0.12 | 0.33 | 0.01 | 0.30 | rest |
| | G | 0.10 | 0.37 | 0.20 | 0.05 | rest |
| | H | 0.08 | 0.48 | 0.16 | 0.01 | rest |
| | I | 0.05 | 0.20 | 0.05 | 0.50 | rest |
| Comparative Example | J | 0.07 | 0.36 | 0.14 | 0.80 | rest |
| | K | 0.09 | 0.40 | 0.05 | 0.001 | rest |
| | L | 0.13 | 0.41 | 0.30 | 0.15 | rest |
| | M | 0.11 | 0.48 | 0.001 | 0.10 | rest |
| | N | 0.08 | 1.00 | 0.15 | 0.30 | rest |
| | O | 0.09 | 0.05 | 0.03 | 0.15 | rest |
| | P | 0.80 | 0.39 | 0.11 | 0.15 | rest |

TABLE 2

| | | | Homogenization Treatment | | Hot Rolling Conditions | | | Intermediate Annealing | | Foil Thickness |
|---|---|---|---|---|---|---|---|---|---|---|
| | Sample No. | Alloy | Temp (° C.) | Time (hr) | Starting Temp (° C.) | End-point Temp. (° C.) | Time required to go through 350 to 500° C. | Temp (° C.) | Method | (μm) |
| Example | 1 | A | 590 | 8 | 540 | 270 | 20 | No Intermediate Annealing | | 15 |
| | 2 | B | 600 | 8 | 550 | 270 | 20 | No Intermediate Annealing | | 15 |
| | 3 | C | 600 | 8 | 550 | 270 | 20 | No Intermediate Annealing | | 15 |
| | 4 | D | 600 | 5 | 540 | 320 | 20 | No Intermediate Annealing | | 15 |
| | 5 | E | 610 | 5 | 540 | 270 | 20 | No Intermediate Annealing | | 15 |
| | 6 | F | 610 | 3 | 540 | 270 | 20 | No Intermediate Annealing | | 15 |
| | 7 | G | 590 | 1 | 530 | 310 | 20 | No Intermediate Annealing | | 15 |
| | 8 | H | 590 | 10 | 530 | 270 | 20 | No Intermediate Annealing | | 15 |
| | 9 | I | 590 | 10 | 540 | 270 | 20 | No Intermediate Annealing | | 15 |
| | 10 | A | 570 | 8 | 540 | 270 | 20 | No Intermediate Annealing | | 15 |
| | 11 | A | 590 | 8 | 520 | 270 | 20 | No Intermediate Annealing | | 15 |
| | 12 | A | 590 | 8 | 540 | 330 | 20 | No Intermediate Annealing | | 15 |
| | 13 | A | 590 | 8 | 540 | 270 | 25 | No Intermediate Annealing | | 15 |
| | 14 | A | 590 | 5 | 530 | 270 | 20 | No Intermediate Annealing | | 6 |
| | 15 | A | 590 | 8 | 530 | 270 | 20 | No Intermediate Annealing | | 30 |
| Comparative Example | 16 | J | 590 | 5 | 550 | 260 | 20 | No Intermediate Annealing | | 15 |
| | 17 | K | 600 | 7 | 550 | 260 | 20 | No Intermediate Annealing | | 15 |
| | 18 | L | 600 | 8 | 540 | 280 | 20 | No Intermediate Annealing | | 15 |
| | 19 | M | 600 | 8 | 540 | 270 | 20 | No Intermediate Annealing | | 15 |
| | 20 | N | 610 | 2 | 530 | 250 | 20 | No Intermediate Annealing | | 15 |
| | 21 | O | 610 | 10 | 530 | 250 | 20 | No Intermediate Annealing | | 15 |
| | 22 | P | 590 | 8 | 540 | 260 | 20 | No Intermediate Annealing | | 15 |
| | 23 | A | 500 | 8 | 540 | 270 | 20 | No Intermediate Annealing | | 15 |
| | 24 | A | 590 | 0.5 | 540 | 270 | 20 | No Intermediate Annealing | | 15 |
| | 25 | A | 590 | 8 | 400 | 270 | 7 | No Intermediate Annealing | | 15 |
| | 26 | A | 590 | 8 | 540 | 350 | 20 | No Intermediate Annealing | | 15 |
| | 27 | A | 620 | 8 | 540 | 270 | 20 | 450 | CAL | 15 |
| | 28 | A | 590 | 8 | 540 | 270 | 20 | 450 | CAL | 15 |
| | 29 | A | 550 | 8 | 540 | 270 | 20 | 450 | CAL | 15 |
| | 30 | A | 450 | 8 | 540 | 270 | 20 | 450 | CAL | 15 |
| | 31 | A | 400 | 8 | 540 | 270 | 20 | 450 | CAL | 15 |
| | 32 | A | 590 | 8 | 540 | 270 | 20 | No Intermediate Annealing | | 5 |

TABLE 3

| Sample No. | | Alloy | Foil After Final Rolling Tensile Strength (MPa) | Foil After Final Rolling Electrical Conductivity (% IACS) | Occurrence of Cut During Foil Rolling | Heating for 24 hours at 100° C. Tensile Strength (MPa) | Heating for 3 hours at 150° C. Tensile Strength (MPa) | Heating for 15 minutes at 200° C. Tensile Strength (MPa) |
|---|---|---|---|---|---|---|---|---|
| Example | 1 | A | 252 | 55.8 | None | 258 | 261 | 227 |
|  | 2 | B | 264 | 56.1 | None | 275 | 276 | 231 |
|  | 3 | C | 296 | 55.4 | None | 301 | 283 | 233 |
|  | 4 | D | 274 | 53.5 | None | 283 | 282 | 248 |
|  | 5 | E | 263 | 57.6 | None | 269 | 264 | 227 |
|  | 6 | F | 244 | 52.1 | None | 265 | 263 | 259 |
|  | 7 | G | 322 | 57.6 | None | 312 | 295 | 251 |
|  | 8 | H | 301 | 57.3 | None | 285 | 271 | 244 |
|  | 9 | I | 281 | 50.3 | None | 299 | 306 | 300 |
|  | 10 | A | 249 | 55.8 | None | 255 | 245 | 220 |
|  | 11 | A | 248 | 56.0 | None | 259 | 255 | 230 |
|  | 12 | A | 242 | 56.3 | None | 248 | 245 | 222 |
|  | 13 | A | 244 | 56.1 | None | 247 | 243 | 220 |
|  | 14 | A | 259 | 55.6 | None | 261 | 262 | 229 |
|  | 15 | A | 248 | 56.1 | None | 253 | 254 | 223 |
| Comparative Example | 16 | J | 334 | 44.7 | Occurred | 347 | 355 | 351 |
|  | 17 | K | 266 | 59.1 | None | 258 | 221 | 194 |
|  | 18 | L | 356 | 54.0 | Occurred | 350 | 344 | 303 |
|  | 19 | M | 238 | 58.8 | None | 236 | 214 | 163 |
|  | 20 | N | 333 | 47.8 | Occurred | 353 | 352 | 347 |
|  | 21 | O | 241 | 57.5 | None | 251 | 245 | 206 |
|  | 22 | P | 341 | 44.2 | Occurred | 347 | 342 | 311 |
|  | 23 | A | 242 | 57.9 | None | 229 | 208 | 185 |
|  | 24 | A | 237 | 58.2 | None | 232 | 207 | 181 |
|  | 25 | A | 240 | 58.0 | None | 233 | 204 | 179 |
|  | 26 | A | 245 | 57.8 | None | 226 | 209 | 188 |
|  | 27 | A | 226 | 58.6 | None | 207 | 188 | 167 |
|  | 28 | A | 228 | 58.3 | None | 204 | 194 | 174 |
|  | 29 | A | 225 | 58.8 | None | 205 | 187 | 161 |
|  | 30 | A | 216 | 59.3 | None | 199 | 186 | 155 |
|  | 31 | A | 219 | 59.0 | None | 201 | 182 | 159 |
|  | 32 | A | 260 | 55.7 | Occurred | 263 | 265 | 228 |

TABLE 4

| Sample No. | | Alloy | Occurrence of Cut During Active Material Applying Step | Heating for 24 hours at 100° C. Occurrence of Wrinkle During Press Working | Heating for 3 hours at 150° C. Occurrence of Wrinkle During Press Working | Heating for 15 minutes at 200° C. Occurrence of Wrinkle During Press Working |
|---|---|---|---|---|---|---|
| Example | 1 | A | None | None | None | None |
|  | 2 | B | None | None | None | None |
|  | 3 | C | None | None | None | None |
|  | 4 | D | None | None | None | None |
|  | 5 | E | None | None | None | None |
|  | 6 | F | None | None | None | None |
|  | 7 | G | None | None | None | None |
|  | 8 | H | None | None | None | None |
|  | 9 | I | None | None | None | None |
|  | 10 | A | None | None | None | None |
|  | 11 | A | None | None | None | None |
|  | 12 | A | None | None | None | None |
|  | 13 | A | None | None | None | None |
|  | 14 | A | None | None | None | None |
|  | 15 | A | None | None | None | None |
| Comparative Example | 16 | J | None | None | None | None |
|  | 17 | K | None | None | None | Occurred |
|  | 18 | L | None | None | None | None |
|  | 19 | M | None | None | None | Occurred |
|  | 20 | N | None | None | None | None |
|  | 21 | O | None | None | None | Occurred |
|  | 22 | P | None | None | None | None |
|  | 23 | A | None | None | Occurred | Occurred |
|  | 24 | A | None | None | Occurred | Occurred |
|  | 25 | A | None | None | Occurred | Occurred |
|  | 26 | A | None | None | Occurred | Occurred |
|  | 27 | A | Occurred | Occurred | Occurred | Occurred |
|  | 28 | A | Occurred | Occurred | Occurred | Occurred |

TABLE 4-continued

| Sample No. | Alloy | Occurrence of Cut During Active Material Applying Step | Heating for 24 hours at 100° C. Occurrence of Wrinkle During Press Working | Heating for 3 hours at 150° C. Occurrence of Wrinkle During Press Working | Heating for 15 minutes at 200° C. Occurrence of Wrinkle During Press Working |
|---|---|---|---|---|---|
| 29 | A | Occurred | Occurred | Occurred | Occurred |
| 30 | A | Occurred | Occurred | Occurred | Occurred |
| 31 | A | Occurred | Occurred | Occurred | Occurred |
| 32 | A | Occurred | None | None | None |

<Tensile Strength>

The tensile strength of the aluminum alloy foil which had been cut out in a rolling direction was measured with an Instron tensile tester AG-10kNX, manufactured by Shimadzu Corporation. The measurement was performed under conditions with a test piece size of 10 mm×100 mm, at a gauge length of 50 mm, and at a crosshead speed of 10 mm/min. In addition, in order to simulate the drying step, heat treatment of 24 hours at 100° C., 3 hours at 150° C., or 15 minutes at 150° C. was carried out. Then, the aluminum alloy foil was cut out in a rolling direction. After that, the tensile strength was measured in the same manner as above. Regarding the tensile strength before heat treatment, tensile strength of 230 MPa or higher and 330 MPa or lower was considered to be acceptable and the tensile strength of less than 230 MPa and higher and 330 MPa was considered to be unacceptable. With regard to the tensile strength after the heat treatment of 24 hours at 100° C., 3 hours at 150° C., or 15 minutes at 150° C., the tensile strength of 210 MPa or higher was considered to be acceptable and the tensile strength of less than 210 MPa was considered to be unacceptable.

<Electrical Conductivity>

Specific resistance value was measured by a four-terminal method, and was converted to electrical conductivity.

<Rollability>

Aluminum alloy foils that were able to be rolled to the thickness as shown in Table 2 without occurrence of ruptures were considered to be acceptable, and those with ruptures or being unable of rolling were considered to be unacceptable.

<Whether or not Cut Occurs During Active Material Coating Process>

Whether or not a cut occurred in a positive electrode material applied during an active material coating process was visually inspected. The case without a cut was considered to be acceptable, and the case with a cut was considered to be unacceptable.

<Whether or not Wrinkle Occurs During Press Working Process>

Whether or not a wrinkle occurred in a press working process was visually inspected. The case without a wrinkle was considered to be acceptable, and the case with a wrinkle was considered to be unacceptable.

In Examples 1 to 15, there was no cut during the active material coating process, and the active material did not peel off. In addition, their electrical conductivity was high. Thus, good evaluation results were achieved.

In Comparative Example 16, the strength became too high, thereby causing cut during foil rolling.

In Comparative Example 17, the strength after the heat treatment of 15 minutes at 200° C. was insufficient, thereby causing wrinkles during press working.

In Comparative Example 18, work hardening was too high, thereby causing cut during foil rolling.

In Comparative Example 19, the strength after the heat treatment of 15 minutes at 200° C. was insufficient, thereby causing wrinkles during press working.

In Comparative Example 20, the strength became too high, thereby causing cut during foil rolling. In Comparative Example 21, the low content of Fe resulted in insufficient strength after the heat treatment of 15 minutes at 200° C., thereby causing wrinkles during press working.

In Comparative Example 22, the strength became too high, thereby causing cut during foil rolling. In Comparative Example 23, strength after the heat treatment of 3 hours at 150° C., 15 minutes at 200° C. was insufficient, thereby causing wrinkles during press working.

In Comparative Example 24, strength after the heat treatment of 3 hours at 150° C., 15 minutes at 200° C. was insufficient, thereby causing wrinkles during press working.

In Comparative Example 25, strength after the heat treatment of 3 hours at 150° C., 15 minutes at 200° C. was insufficient, thereby causing wrinkles during press working.

In Comparative Example 26, strength after the heat treatment of 3 hours at 150° C., 15 minutes at 200° C. was insufficient, thereby causing wrinkles during press working.

In Comparative Examples 27 and 28, strength and strength after the heat treatment of 24 hours at 100° C., 3 hours at 150° C., 15 minutes at 200° C. was insufficient, thereby causing cut during active material coating process and wrinkles during press working.

In Comparative Examples 29, 30 and 31, strength and strength after the heat treatment of 24 hours at 100° C., 3 hours at 150° C., 15 minutes at 200° C. was insufficient, thereby causing cut during active material applying step and wrinkles during press working.

In Comparative Example 32, cut occurred during foil rolling.

The invention claimed is:

1. A method for manufacturing an aluminum alloy foil for electrode current collector, comprising the steps of:

performing a homogenization treatment of an aluminum ingot consisting of 0.2% to 0.48 mass % (hereinafter mass % is referred to as %) of Fe, 0.05% to 0.3% of Si, 0.02% to 0.16% of Cu, 0.05% to 0.3% of Mn, and unavoidable impurities, wherein a total amount of the unavoidable impurities is 0.15% or less, and the amount of each of the unavoidable impurities being 0.02% or less, for 1 to 20 hours at 570° C. or higher and 620° C. or lower;

performing a hot rolling after the homogenization treatment with a starting temperature of 520° C. or higher and an end-point temperature of 330° C. or lower; and performing a plurality of cold rolling;

wherein an intermediate annealing is not performed immediately before the plurality of cold rolling, an intermediate annealing is not performed in between each of the plurality of cold rolling, and an intermediate annealing is not performed after the plurality of cold rolling.

2. The method for manufacturing of claim 1, wherein a time required to go through a temperature range of 350° C. to 500° C. during the hot rolling is within 20 minutes.

3. The method for manufacturing of claim 1, wherein the homogenization treatment is performed at 590° C. or higher and 620° C. or lower.

* * * * *